United States Patent [19]

Mueller et al.

[11] 4,145,502

[45] Mar. 20, 1979

[54] SPHEROIDAL PARTICULATE POLYTETRAFLUOROETHYLENE DISPERSION RESIN

[75] Inventors: Max B. Mueller, Morristown; Peter P. Salatiello, Morris Plaines; Dulari L. Sawhney, Highland Park, all of N.J.

[73] Assignee: Allied Chemical Corporation, Morristown, N.J.

[21] Appl. No.: 794,683

[22] Filed: May 6, 1977

Related U.S. Application Data

[62] Division of Ser. No. 328,226, Jan. 31, 1973, Pat. No. 4,038,230, which is a division of Ser. No. 91,046, Nov. 19, 1970, Pat. No. 3,752,796.

[51] Int. Cl.$^2$ .............................................. C08F 14/26
[52] U.S. Cl. .............................. 526/255; 260/29.6 F
[58] Field of Search .............................. 526/250, 255; 260/29.6 F

[56] References Cited

U.S. PATENT DOCUMENTS

2,559,752  7/1951  Berry ................................ 260/29.6 F

*Primary Examiner*—Harold D. Anderson
*Attorney, Agent, or Firm*—Gerhard H. Fuchs; Michael S. Jarosz

[57] ABSTRACT

Particulate polytetrafluoroethylene dispersion resin characterized by high molecular weight, relatively large particle size, uniform spherical particle shape and narrow particle size distribution, which is suitable for making stable concentrated aqueous polytetrafluoroethylene dispersions of concentrations higher than heretofore available, is made by polymerization of tetrafluoroethylene in aqueous dispersion in the conjoint presence of liquid octafluorocyclobutane and certain polyfluorinated carboxylic acid salt dispersing agents, using water-soluble peroxide initiators.

1 Claim, 3 Drawing Figures

1.0μ

1.0μ

SPHEROIDAL PARTICULATE POLYTETRAFLUOROETHYLENE DISPERSION RESIN

This is a division of application Ser. No. 328,226, filed Jan. 31, 1973 now U.S. Pat. No. 4,038,230, which in turn is a divisional of U.S. application Ser. No. 91,046, filed Nov. 19, 1970, now U.S. Pat. No. 3,752,796.

SUMMARY OF THE INVENTION

The present invention relates to a novel, particulate polytetrafluoroethylene resin obtained by polymerization of tetrafluoroethylene in aqueous dispersion which is characterized by (1) high molecular weight, (2) relatively large average particle size, (3) uniform spherical particle shape, and (4) narrow particle size distribution. As a result of this combination of properties, the particulate polytetrafluoroethylene resin of the present invention is suitable for making stable concentrated aqueous polytetrafluoroethylene dispersions of concentrations higher than those heretofore available. The present invention also relates to a method for making these novel polytetrafluoroethylene resins which involves polymerizing tetrafluoroethylene in aqueous dispersion using conventional peroxide initiators, which method is characterized by the critical conjoint presence in the polymerization medium of liquid octafluorocyclobutane, in certain proportions, together with certain polyfluorinated carboxylic acid salt dispersing agents.

BACKGROUND OF THE INVENTION

The desirability in polytetrafluoroethylene dispersion resins of uniform particle shape, large average particle size, narrow particle size distribution as well as high molecular weight has long been recognized by those skilled in the art. Prior attempts to make polytetrafluoroethylene dispersion resins having this combination of properties were unsuccessful. Known high molecular weight polytetrafluoroethylene dispersion resins having relatively large average particle size lack either one or both of uniform particle shape and/or narrow particle size distribution. On the other hand, known polytetrafluoroethylene resins having large average particle size in combination with uniform particle shape and narrow particle size distribution have relatively low molecular weight, hence reduced thermal stability, which severely limits their use in many applications.

In the past, many methods have been proposed for making polytetrafluoroethylene dispersion resins of large average particle size, such as polymerizing to higher solid content; initiating the polymerization at temperatures below those employed during subsequent portions of the reaction period; conducting the polymerization under reduced agitation; reducing the concentration of dispersing agent; conducting the polymerization in the presence of small proportions of dissolved polyvalent metallic cations; or by "seeding" the polymerization medium by inclusion therein of "seeds" of dispersed polytetrafluoroethylene particles. All of these methods, unfortunately, suffer from one or more of the following disadvantages: lowered average molecular weight of the product; lowered overall space time yield; increased amount of coagulation; and wide variations from batch to batch in particle size and particle size distribution. None of the known methods for making polytetrafluoroethylene dispersion resins reproducibly allows production of resins having, in combination, uniform particle shape, large average particle diameter, narrow particle size distribution and high molecular weight, and none of these known methods allows production of polytetrafluoroethylene dispersion resin having the advantageous combination of properties possessed by the resins of the present invention.

Production of dispersion polytetrafluoroethylene resins of large, uniform particle size has heretofore been considered desirable because they were thought to have improved extrusion characteristics. While the novel resins of the present invention, which combine large average particle size and uniformity of particle shape with narrow particle size distribution, have good extrusion characteristics when "paste extruded" after admixture with lubricants, such as deodorized kerosene, in amount of about 20% by weight in the manner known to those skilled in the art, their extrusion characteristics do not appear to be substantially superior to those of known resins. However, the resins of the present invention have dispersion characteristics which are substantially superior to those of known products. Aqueous dispersions of the product of the present invention, as obtained from the polymerization process, can be concentrated by simple procedures to form stable concentrated aqueous dispersions containing more than about 75% by weight of polytetrafluoroethylene resin. Stable concentrated aqueous polytetrafluoroethylene dispersions of such high concentrations have heretofore not been available.

Figure 1:
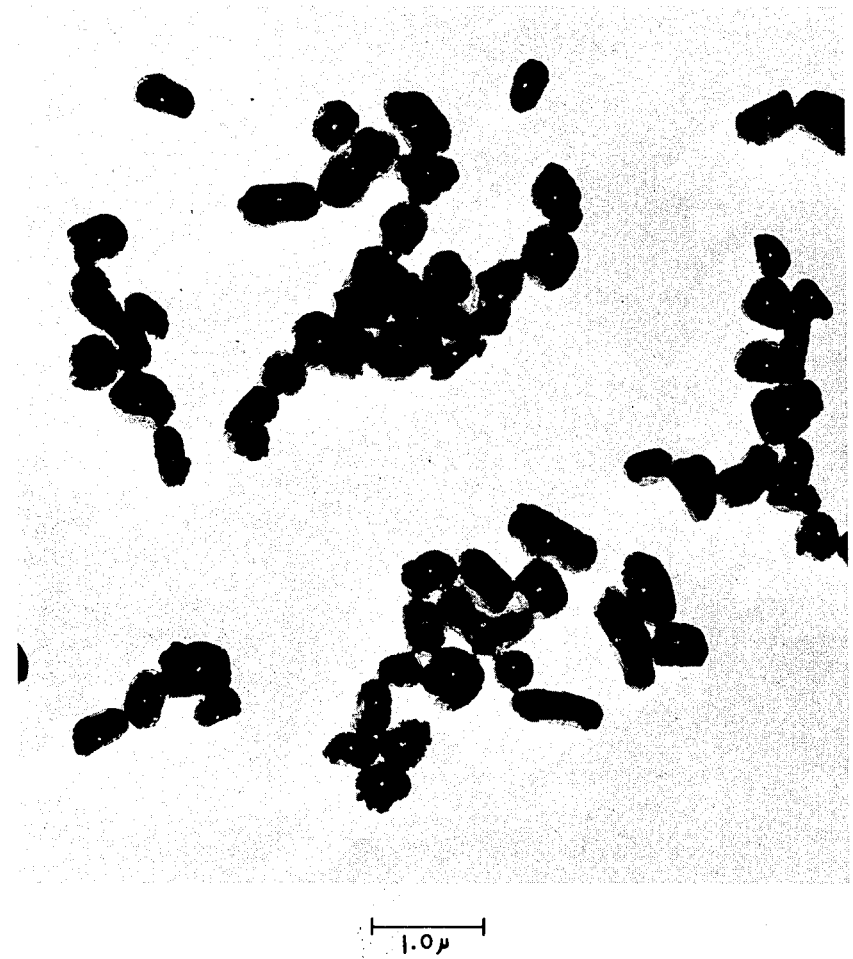
FIG. 1 is an electron photomicrograph of a particulate dispersion polytetrafluoroethylene resin made in accordance with the present invention obtained by polymerization of tetrafluoroethylene in the conjoint presence of liquid octafluorocyclobutane and ammonium perfluorocaprylate (dispersing agent)

clearly demonstrate the surprising improvement in average particle size, uniformity of particle shape and particle size distribution solely attributable to the conjoint use of liquid octafluorocyclobutane and the specific dispersing agent in accordance with the process of the present invention.

DETAILED DESCRIPTION OF THE INVENTION

The particulate polytetrafluoroethylene dispersion resin of the present invention is characterized by (1) having a surface area of at least about 9 sq.m./g., (2) predominantly comprising spheroidal particles having an average particle diameter of greater than 0.35 micron, (3) having a narrow particle size distribution corresponding to a distribution function of less than 0.4, and having (4) a molecular weight of at least $2.0 \times 10^6$ corresponding to a standard specific gravity of 2.23 or less. Preferred polytetrafluoroethylene of the present invention have an average particle diameter of greater than 0.4 micron, and especially those having, in addition thereto, a particle size distribution corresponding to a distribution function of less than 0.25.

"Surface area," "particle diameter," "distribution function," "molecular weight" and "standard specific gravity," as used in the specification and claims are defined and determined as follows:

Surface area is determined by nitrogen absorption by the method described by Barr & Anhorn, *Scientific & Industrial Glass Blowing Laboratory Techniques,* Instruments Publishing Company, (1949), Chapter XII, or equivalent procedure.

Average particle diameter and Distribution function are determined from electron microphotographs of the product using a Zeiss Particle Size Analyzer TG23 by the below-described procedure, or equivalent.

In that procedure an electron photomicrograph at known magnification of the product to be analyzed is obtained whereon the individual particles are shown in size between 0.5 and 9.14 mm. Using the Zeiss Particle Size Analyzer TG23, set at "E, linear, reduced", a count is obtained and tabulated of the total number of particles of each of 48 individual size ranges between 0.5 and 9.14 mm. Based on the known magnification of the photomicrograph, the original particle size in microns of the sample as represented by each of the 48 counted size ranges is calculated. The number of particles counted within each of these 48 size ranges is totaled and the individual as well as cumulative percentage of total numbers of particles within these size ranges is calculated. The cumulative percentage of particle size in microns within the particle size ranges is plotted on probability paper and a best fit line is drawn through the plot. The particle size at the 50% probability level is determined as the average particle diameter. The distribution function is calculated as average particle size in microns at the 84% probability level minus average particle size in microns at the 50% probability level, divided by the average particle size in microns at the 50% probability level.

Standard specific gravity (S.S.G.) is determined by the method set forth in ASTM D1457-69, or equivalent.

Molecular weight which, as used in the specification and claims is the number average molecular weight, is determined from the standard specific gravity in accordance with the empirical equation $$\log_{10}\overline{M}n = \frac{0.466 - \log_{10}S.S.G.}{0.0187}$$

The particulate polytetrafluoroethylene resin of the present invention is further characterized by its capacity for forming stable concentrated aqueous dispersions containing at least 75% by weight of polytetrafluoroethylene when the latex as obtained from the polymerization reaction, which may contain as little as about 15% by weight of polytetrafluoroethylene, is concentrated by the following method: To the latex as obtained from the polymerization, there is added a polyethylene glycol-p-octyl phenol ether having the formula

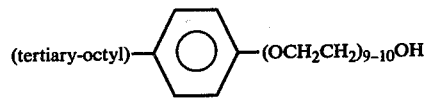

sold by Rohm & Haas Company as "Triton X-100," in form of a 20% by weight aqueous solution, in amount sufficient to incorporate in the latex 2% by weight of the polyethylene glycol-p-octyl phenol ether, based on the combined weight of the water. The pH of the latex is adjusted to about 5 by addition of aqueous ammonia, and a 1% aqueous solution of ammonium alginate is dispersed in the latex with gentle agitation in amount sufficient to incorporate therein 0.1% ammonium alginate, based on the combined weight of the water. The latex is allowed to stand for 16 hours at ambient temperature (about 220° C.) during which time it will separate into a concentrated latex phase and a supernatent clear aqueous phase. Upon separation of the supernatant aqueous phase, the concentrated latex phase contains at least about 75% by weight of polytetrafluoroethylene.

The particulate polytetrafluoroethylene resin of the present invention is prepared by polymerization of tetrafluoroethylene in an agitated aqueous medium using water soluble peroxide polymerization initiator in the presence of at least 6% by weight, based on the weight of the aqueous medium, of liquid octafluorocyclobutane (corresponding to about 4% by volume, based on total liquid reactor contents), in combination with, as an ionizable dispersing agent, of a salt having a solubility in water of at least 0.1% at 100° C. selected from the group consisting of the alkali metal, ammonium and substituted ammonium salts of a polyfluoroalkanoic acid having the formula $B(CF_2)_n COOH$ wherein B is selected from the group consisting of hydrogen and fluorine and n is an integer of from 6 to 20. Critical in the method for the production of the particulate polytetrafluoroethylene resin of the present invention is the conjoint presence, during the polymerization, of liquid octafluorocyclobutane together with one or more of the above described dispersing agents. When the polymerization reaction is conducted under otherwise identical conditions but in the absence of either one or both of liquid octafluorocyclobutane or of the above-described wetting agents, then the product of the present invention is not obtained.

As above described, the dispersion polymerization of tetrafluoroethylene in accordance with the present invention is conducted in an aqueous medium, which is preferably based on deionized water.

The choice of the water-soluble peroxide catalyst employed in the polymerization in accordance with the present invention is not critical. Selection may be made from a large number of water-soluble peroxide catalysts or redox systems which are conventionally used in dispersion polymerization of polytetrafluoroethylene. Suitable catalysts include, for example, potassium persulfate, sodium persulfate and ammonium persulfate. These initiators may be used in conjunction with suitable reducing agents which act as catalyst activators, such as alkali metal bisulfites or alkali metal sulfites. If desired, these water-soluble catalysts may also be used in conjunction with known accelerators therefor, such as silver salts, for example silver nitrate or silver nitrite; ferrous sulfate; ferrous nitrate and others. Generally, the catalyst may be employed in amount of about 0.005 to about 2%, usually about 0.01 to about 1.0%, preferably about 0.2 to about 0.7%, by weight, based on the water charge.

Of the above-described dispersing agents, the perfluorinated dispersing agents are preferred. Especially preferred are the ammonium salts of the perfluoroalkanoic acids of the above formula. A particularly preferred dispersing agent is ammonium perfluorocaprylate, which is a readily available commercial product. While the presence of the dispersing agent in amount of at least about 0.05% by weight is critically required, it is ordinarily employed in amounts ranging from 0.1 to 1.0, preferably in amount ranging from 0.1 to about 0.5% by weight, based on the weight of the aqueous medium. If the dispersing agent is employed in amount of less than about 0.05% by weight, then the product tends to coagulate before acceptable levels of solids content are obtained during polymerization. Use of dispersing agent in excess of about 1.0% by weight ordinarily causes a decrease in particle size, so that it becomes difficult to obtain the product of the present invention requiring an average particle diameter of greater than 0.35%.

The octafluorocyclobutane is a commercially available product. It is, e.g. obtained as a by-product in the production of tetrafluoroethylene by pyrolysis of monochlorodifluoromethane and can be recovered from the pyrolysis stream by conventional methods as, e.g., by fractional distillation. In the process of the present invention, the octafluorocyclobutane must be present in the polymerization medium in liquid phase in critical amount of at least about 6.0%, usually in amounts of between about 6.0 and about 20.0% by weight, preferably 10.0 to about 15.0% by weight, based on the weight of the aqueous portion of the reaction medium.

The polymerization of the tetrafluoroethylene monomer in aqueous dispersion in the conjoint presence of liquid octafluorocyclobutane and one or more of the above-described dispersing agents is carried out in accordance with known procedures, e.g. as described in U.S. Pat. No. 2,393,967, under super-atmospheric pressures up to about 3,000 atmospheres at temperatures of from about 0° to about 100° C. Preferred polymerization temperatures range between about 25° and about 50° C., more preferably between about 30° and about 40° C. The polymerization may be carried out at any desired pressure so long as the pressure is of sufficient magnitude to ensure presence of octafluorocyclobutane in the reaction medium in liquid phase. It is suitably conducted at pressures ranging from about 50 to about 200 psig. For reasons of economy in equipment design, it is preferably carried out at pressures below about 200 psig.

The following examples further illustrate the present invention. They are not to be interpreted as a limitation thereon.

EXAMPLE I

An agitator-equipped one-gallon stainless steel high pressure autoclave was charged with 2,000 grams of deionized water, 4 grams of ammonium perfluorocaprylate and 13.4 grams of potassium persulfate. The autoclave was evacuated and 200 grams of octafluorocyclobutane were added to the water in the autoclave. The autoclave was sealed and its contents were heated to 35° C. Internal pressure of the autoclave at that temperature was 50 psig., corresponding to the vapor of pressure of the octafluorocyclobutane at that temperature. Tetrafluoroethylene gas was then fed to the autoclave until the pressure reached 150 psig, and internal pressure of 150 psig was maintained in the autoclave throughout the polymerization reaction by continually feeding tetrafluoroethylene monomer by means of a pressure regulating valve. The agitator was started and after about 6 minutes polymerization began, as evidenced by a drop in pressure in the supply cylinder. After about 1½ hours polymerization time the tetrafluoroethylene feed was discontinued and the reactor was vented to remove unreacted tetrafluoroethylene monomer and the octafluorocyclobutane. The autoclave was opened and was found to contain a stable latex with virtually no coagulum. The latex contained about 28% solids, corresponding to about 760 grams of polymer formed, which represents a space-time yield of about 2.10 lbs/hour/gal.

The latex so obtained was examined under an electron microscope at 13,700 magnification. The polymer particles were of uniform spherical shape, they had an average diameter of 0.48 microns with particles ranging in size of from 0.36 to 0.61 micron. The distribution function, determined as described above, was 0.19. The polymer product had a molecular weight of $5.6 \times 10^6$, based on a Standard Specific Gravity of 2.188. A portion of the electron photomicrograph, enlarged to 25,000 magnification, is shown as FIG. 1.

COMPARATIVE EXPERIMENT 1

An agitator-equipped one-gallon stainless steel high pressure autoclave was charged with 2,000 grams of deionized water, 4 grams of ammonium perfluorocaprylate, 2 grams of potassium persulfate and 140 ml. of mineral oil. The autoclave was evacuated and then pressurized with tetrafluoroethylene to a pressure of 300 psig, which pressure was maintained throughout the polymerization reaction by continually feeding tetrafluoroethylene monomer by means of a pressure regulating valve. The agitator was started and reactor contents were heated to 65° C. which temperature was maintained throughout the polymerization reaction. After 45 minutes polymerization time, tetrafluoroethylene feed was discontinued and the autoclave was opened and found to contain a latex containing about 25.9% solids, corresponding to about 700 grams of polymer formed, which represents a space-time yield of about 3.89 lbs/hour/gal.

Figure 2:
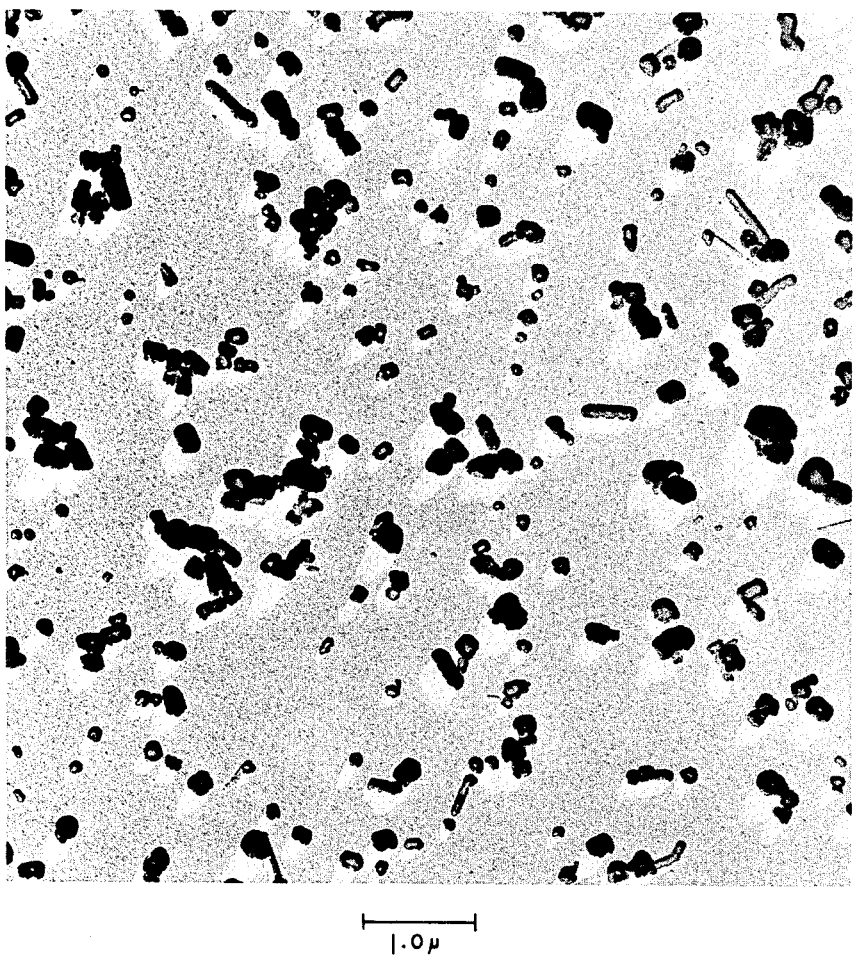
FIG. 2 is an electron photomicrograph of a particulate dispersion polytetrafluoroethylene resin of the prior art made under conditions comparable to those employed to make the product shown in FIG. 1, except that mineral oil was substituted for the octafluorocyclobutane.

The latex so obtained was examined under an electron microscope at 12,500 magnification. The polymer particles were of a regular shape. They had an average diameter of 0.2 microns with particles ranging in size of from about 0.07 to 0.52 microns. The distribution function, determined as described above, was 0.33. The polymer product had a molecular weight of $2.3 \times 10^6$ based on a standard specific gravity of 2.222. A portion of the electron photomicrograph enlarged to 25,000 magnification is shown as FIG. 2.

COMPARATIVE EXPERIMENT 2

The high pressure autoclave employed in Example I was charged with 2,000 grams of deionized water, 1 gram of ammonium persulfate, 0.438 grams of sodium bisulfite, and 0.008 grams of $FeSO_4 \cdot 7H_2O$. The autoclave was evacuated and 198 grams of octafluorocyclobutane were added to the water in the autoclave. The autoclave was sealed and its contents were heated to 60° C. and tetrafluoroethylene gas was fed to the autoclave until pressure reached 150 psig. Internal pressure in the autoclave was maintained between 145 and 155 psig throughout the polymerization reaction by continually feeding tetrafluoroethylene monomer by means of a pressure regulating valve. Polymerization was continued for 5 hours under constant agitation. The reactor was then vented to remove unreacted tetrafluoroethylene monomer and the octafluorocyclobutane. The autoclave was opened and found to contain a latex with considerable coagulum on the agitator thermometer well and reactor walls. The latex contained 0.8% by weight of polytetrafluoroethylene solids.

Figure 3:
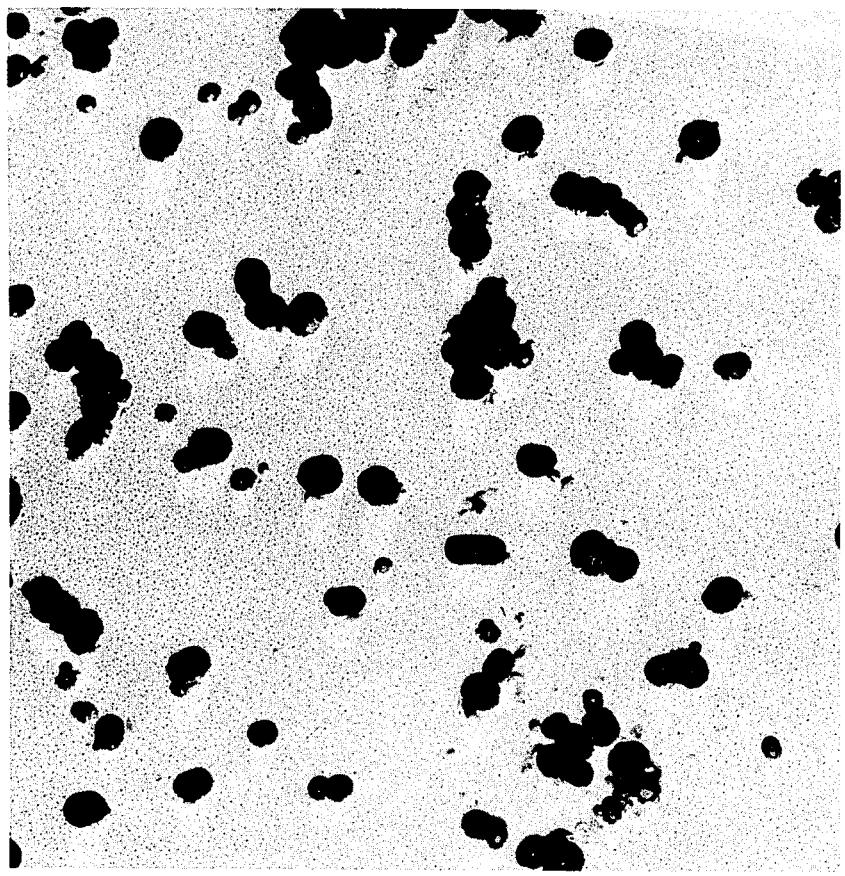
FIG. 3 is an electron photomicrograph of a particulate dispersion polytetrafluoroethylene resin of the prior art made under conditions comparable to those employed to make the product shown in FIG. 1, except that the ammonium perfluorocaprylate dispersing agent was omitted from the polymerization medium.

The latex so obtained was examined under an electron microscope at 11,250 magnification. The polymer particles were of spherical shape; they had an average diameter of 0.30 micron with particles ranging in size of from 0.14 to 0.60 micron. The distribution function was 0.22. A portion of the electron photomicrograph enlarged to 25,000 magnification is shown as FIG. 3.

COMPARATIVE EXPERIMENT 3

Example I was repeated using 2,000 grams of deionized water, 7.34 grams of potassium persulfate, 4 grams of ammonium perfluorocaprylate and 2 grams of potassium sulfate. For the octafluorocyclobutane employed in Example I, there was substituted 280 grams of 1,1,2-trifluorotrichloroethane (of which about 268 grams were present in liquid form in the autoclave during the polymerization). Polymerization was conducted at a temperature of 35° C. until a latex containing about 20% of tetrafluoroethylene solids (500 grams of polytetrafluoroethylene) was obtained. The polymer particles in the latex so obtained had an average diameter of 0.33 micron and a distribution function of 0.29. The molecular weight of the product was $1.6 \times 10^6$ based on standard specific gravity of 2.238.

Example II below describes preparation of a concentrated polymer latex from a latex obtained by the process of the present invention following the procedure of Example I.

EXAMPLE II

To about 900 ml. of a polytetrafluoroethylene latex containing about 20.9% solids obtained by the method illustrated in Example I with polymer solids of average particle diameter in excess of 0.4 micron and distribution function of about 0.2, there was added 100 ml. of a 20% by weight aqueous solution of

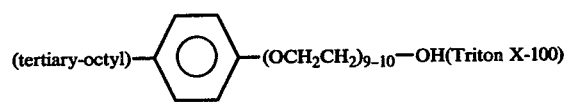

with gentle agitation. The pH of that mixture was adjusted to 5.0 by dropwise addition of aqueous ammonia. To the mixture was then added 100 ml. of a 1% by weight aqueous ammonium alginate solution with gentle stirring and the mixture was allowed to stand overnight at ambient temperature (about 22° C.), allowing it to separate into a concentrated latex phase and a supernatant liquid phase. The phases were separated by decantation to obtain a stable concentrated latex phase containing 79% by weight of polytetrafluoroethylene solids.

The particulate polytetrafluoroethylene resin of the present invention is especially suited for casting films and coating or impregnating of textiles, glass, fabrics, ceramics, metal and wood. It is particularly advantageously used in concentrated dispersion, resulting in formation of thicker coatings, at reduced "mud-cracking," in single coat applications as a result of the higher concentration and large particle size.

Since various changes in modifications may be made in the invention without departing from the spirit and the essential characteristics thereof, it is intended that all matter contained in the above description shall be interpreted as illustrative only, the invention being limited only by the scope of the appended claims.

We claim:

1. Particulate polytetrafluoroethylene resin having a surface area of at least 9 sq.m./g., predominantly comprising spheroidal particles having an average particle diameter of greater than 0.35 micron, a narrow particle size distribution corresponding to a distribution function of less than 0.4, and a number average molecular weight of at least $2.0 \times 10^6$ which is characterized by its capacity for forming concentrated aqueous dispersions containing at least 75 percent by weight of polytetrafluoroethylene produced by the method which involves adding to an aqueous latex consisting of at least about 15 percent by weight of said particulate polytetrafluoroethylene a polyethylene glycol-p-octyl phenol ether having the formula

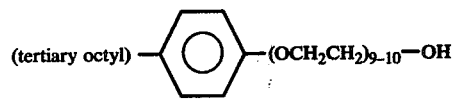

in amount of 2 percent by weight, based on the weight of the water, adjusting the pH of the latex to about 5 by adding aqueous ammonium, dispersing a 1 percent aqueous solution of ammonium alginate in the latex in amount sufficient to incorporate therein 0.1 percent of ammonium alginate, based on the combined weight of the water, allowing the latex to stand for 16 hours to cause it to separate into a concentrated latex phase and a supernatant clear aqueous phase, and separating the phases so formed to recover a concentrated polytetrafluoroethylene dispersion containing at least 75 percent by weight of polytetrafluoroethylene.

* * * * *